United States Patent
Grier et al.

(10) Patent No.: US 7,759,020 B2
(45) Date of Patent: Jul. 20, 2010

(54) MULTI-COLOR HOLOGRAPHIC OPTICAL TRAPS

(75) Inventors: David G. Grier, New York, NY (US); Sang-Hyuk Lee, Rego Park, NY (US)

(73) Assignee: New York University, New York, NY (US)

( * ) Notice: Subject to any disclaimer, the term of this patent is extended or adjusted under 35 U.S.C. 154(b) by 955 days.

(21) Appl. No.: 11/439,865

(22) Filed: May 24, 2006

(65) Prior Publication Data

US 2007/0273944 A1    Nov. 29, 2007

(51) Int. Cl.
G03H 1/02    (2006.01)

(52) U.S. Cl. .............................. 430/1; 430/2; 430/321; 359/3; 359/25; 359/31

(58) Field of Classification Search ........................ None
See application file for complete search history.

(56) References Cited

U.S. PATENT DOCUMENTS

2005/0081824 A1* 4/2005 Chen et al. .................. 123/399

OTHER PUBLICATIONS

Leach et al., "Observation of chromatic effects near a white-light vortex", New J. Phys., vol. 5 pp. 154.1-175.7 (Nov. 2003).*
Chiou et al. "photorefractive phase conjugate optics for image processing, trapping and manipulation", Proc. IEEE vol. 87(12) pp. 2074-2085 (Dec. 1999).*
Kim et al. "An array of phase singularities in a self defocussing medium". Opt. Commun. vol. 147 pp. 131-137 (Feb. 1998).*
Soskin et al. "computer synthesized hologram based rainbow optical vortices", New J. Phys., vol. 6 (010196, pp. 1-8) (Dec. 2004).*
Arkheluk et al. "Rainbow optical vortices" Proc SPIE vol. 5477 pp. 77-82 (Jun. 2004).*
Hossack et al. "High speed holographic optical tweezers using ferroelectric liquid crystal microdisplay" Opt. Exp. vol. 11(17) pp. 2053-2059 (Aug. 2003).*
Lafong et al. "Time-multiplexed Laguerre-Gaussian holographic tweezers for biological applications" Opt. Exp. vol. 14(7) pp. 3065-3072 (Apr. 2006).*
Leach et al. "3D manipulatiuon of particles into crystal structures using holographic optical tweezers" Opt. Exp. vol. 12(1) pp. 220-226 (Jan. 2004).*
Di Fabrizio et al. "Microscopy of biological sample through advanced diffractive optics . . . " Microsc. Res. & Tech. vol. 65 pp. 252-262 (2004).*
L. B. Lesem, P. M. Hirsch and J. A. Jordan, JR., "The Kinoform: A New Wavefront Reconstruction Device", *IBM J. Res. Develop.*, Mar. 1969 , pp. 150-155.

(Continued)

*Primary Examiner*—Martin J Angebranndt
(74) *Attorney, Agent, or Firm*—Foley & Lardner LLP

(57) ABSTRACT

A method and system for providing multi-color holographic optical traps and patterns. The method and system employs a laser beam which interacts with a diffractive optical element with a hologram and for optics which acts to selectively pass or attenuate different light color wavelengths and to position the particular color light at selected different locations to form the different color holographic optical trap patterns and to use these patterns for various commercial purposes.

19 Claims, 2 Drawing Sheets

OTHER PUBLICATIONS

A. Ashkin, J. M. Dziedzic, J. E. Bjorkholm and S. Chu, "Observation of a Single-Beam Gradient Force Optical Trap for Dielectric Particles", *Optical Letters*, May 1986, pp. 288-290, vol. 11, No. 5, Optical Society of America.

A. Vasara, J. Turunen and A. T. Friberg, "Realization of General Nondiffracting Beams with Computer-Generated Holograms", *J. Opt. Soc. Am. A*, Nov. 1989, pp. 1748-1754, vol. 6, No. 11, Optical Society of America.

H. He, N. R. Heckenberg and H. Rubinsztein-Dunlop, "Optical Particle Trapping with Higher-Order Doughnut Beams Produced Using High Efficiency Computer Generated Holograms", *Journal of Modern Optics*, 1995, pp. 217-223, vol. 42, No. 1, Taylor & Francis Ltd.

N. B. Simpson, L. Allen and M. J. Padgett, "Optical Tweezers and Optical Spanners with Laguerre-Gaussian Modes", *Journal of Modern Optics*, 1996, pp. 2485-2491, vol. 43, No. 12. Taylor & Francis, Ltd.

K. T. Gahagan and G. A. Swartzlander, Jr., "Optical Vortex Trapping of Particles", *Optics Letters*, Jun. 1, 1996, pp. 827-829, vol. 21, No. 11, Optical Society of America.

J. Bengtsson, "Kinoforms Designed to Produce Different Fan-Out Patterns for Two Wavelengths", *Applied Optics*, Apr. 10, 1998, pp. 2011-2020, vol. 37, No. 11, Optical Society of America.

E. R. Dufresne and D. G. Grier, "Optical Tweezer Arrays and Optical Substrates Created with Diffractive Optics", *Review of Scientific Instruments*, May 1998, pp. 1974-1977, vol. 69, No. 5, American Institute of Physics.

M. Reicherter, T. Haist, E. U. Wagemann, and H. J. Tiziani, "Optical Particle Trapping with Computer-Generated Holograms Written on a Liquid-Crystal Display", *Optics Letters*, May 1, 1999, pp. 608-610, vol. 24, No. 9, Optical Society of America.

J. Liesener, M. Reicherter, T. Haist and H. J. Tiziani, "Multi-Functional Optical Tweezers Using Computer-Generated Holograms", *Optics Communications*, Nov. 1, 2000, pp. 77-82, 185, Elsevier.

E. R. Dufresne, D. Altman and D. G. Grier, "Brownian Dynamics of a Sphere Between Parallel Walls", *Europhysics Letters*, Jan. 15, 2001, pp. 264-270, 53 (2), EDP Sciences.

U. Levy, E. Marom and D. Mendlovic, "Simultaneous Multicolor Image Formation with a Single Diffractive Optical Element", *Optics Letters*, Aug. 1, 2001, pp. 1149-1151, vol. 26, No. 15, Optical Society of America.

J. Arlt, V. Garces-Chavez, W. Sibbett and K. Dholakia, "Optical Micromanipulation Using a Bessel Light Beam", *Optics Communications*, Oct. 1, 2001, pp. 239-245, 197, Elsevier.

J. E. Curtis, B. A. Koss and D. G. Grier, "Dynamic Holographic Optical Tweezers", *Optics Communications*, Jun. 15, 2002, pp. 169-172, 207, Elsevier.

J. E. Curtis and D. G. Grier, "Structure of Optical Vortices", *Physical Review Letters*, Apr. 4, 2003, pp. 133901-1-133901-4, vol. 90, No. 13, The American Physical Society.

J. E. Curtis and D. G. Grier, "Modulated Optical Vortices", *Optics Letters*, Jun. 1, 2003, pp. 872-874, vol. 28, No. 11, Optical Society of America.

D. G. Grier, "A Revolution in Optical Manipulation", *Nature*, Aug. 14, 2003, pp. 810-816, vol. 424, Nature Publishing Group.

K. Ladavac and D. G. Grier, "Microoptomechanical Pumps Assembled and Driven by Holographic Optical Vortex Arrays", *Optics Express*, Mar. 22, 2004, pp. 1144-1149, vol. 12, No. 6, OSA.

C-S. Guo, X. Liu, J-L. He and H-T. Wang, "Optimal Annulus Structures of Optical Vortices", *Optics Express*, Sep. 20, 2004, pp. 4625-4634, vol. 12, No. 19, OSA.

K. Ladavac, K. Kasza and D. G. Grier, "Sorting Mesoscopic Objects with Periodic Potential Landscapes: Optical Fractionation", *Rapid Communications—Physical Review*, 2004, pp. 010901-1-010901-4, 2004, 70, The American Physical Society.

S. Sundbeck and I. Gruzberg, "Structure and Scaling of Helical Modes of Light", *Optics Letter*, Mar. 1, 2005, pp. 477-479, vol. 30, No. 5, Optical Society of America.

L. L. Doskolovich, N. L. Kazanskiy, V. A. Soifer, P. Perlo and P. Repetto, "Design of DOEs for Wavelength Division and Focusing", *Journal of Modern Optics*, Apr. 15, 2005, pp. 917-926, vol. 52, No. 6, Taylor & Francis.

K. Ladavac and D. G. Grier, "Colloidal Hydrodynamic Coupling in Concentric Optical Vortices", *Europhysics Letters*, May 15, 2005, pp. 548-554, 70 (4) EDP Sciences.

Y. Roichman and D. G. Grier, "Holographic Assembly of Quasicrystalline Photonic Heterostructures", *Optics Express*, Jul. 11, 2005, pp. 5434-5439, vol. 13, No. 14, OSA.

M. Polin, K. Ladavac, S-H. Lee, Y. Roichman and D. G. Grier, "Optimized Holographic Optical Traps", *Optics Express*, Jul. 25, 2005, pp. 5831-5845, vol. 13, No. 15, OSA.

\* cited by examiner

MULTI-COLOR HOLOGRAPHIC OPTICAL TRAPS

This work was supported by National Science Foundation Grant Number DMR-0451589 and DBI-0233971.

FIELD OF THE INVENTION

The present invention relates generally to creation of three-dimensional patterns of multi-functional optical traps. More particularly the invention relates to encoding of optical traps in phase-only computer holograms that can be projected with the holographic optical trap (HOT) technique. Further, this methodology can be used to implement multi-color holographic optical tweezers with one or more holograms.

BACKGROUND OF THE INVENTION

Holographic optical traps use phase-only holograms to form large arrays of optical traps from a single input laser beam. By combining the beam-splitting and wavefront-shaping capabilities of computer generated holograms, holographic traps can be arranged in arbitrary three-dimensional configurations, with each trap having independently specified characteristics, including relative intensity and mode structure. The control over the microscopic world afforded by this technique has been widely adopted for fundamental research in soft-matter systems and for biomedical and industrial applications.

In principle, holographic trapping patterns can be projected with absolute fidelity to design and near-ideal efficiency. Practical diffractive optical elements (DOEs), however, seldom offer the requisite continuously varying phase profiles, and almost never provide precisely the phase pattern required for in a given design. This has been recognized in the prior art as a central problem for holographic projection systems since the introduction of the kinoform. Imperfectly imprinting the designed phase pattern onto the input beams wavefronts degrades the projected intensity patterns.

SUMMARY OF THE INVENTION

The present invention therefore involves resolving the problem of imperfect phase patterns and applications of techniques for commercial advantage. Although phase encoding errors reduce the overall intensities of a projected pattern of traps the errors do not affect the traps' position, relative intensities or mode structure. To quantify this, we introduce an expansion of the projected field into generalized conjugates of the designed field. This analysis demonstrates that the performance of optimized holographic trapping systems is selectively robust against phase defects, and further suggests useful generalizations of the technique, including without limitation the formation of multi-color holographic optical tweezers.

These and other objects, advantages and features of the invention, together with the organization of manner of operation thereof will become apparent from the following detailed description when taken in conjunction with the accompanying drawings wherein like elements have like numerals throughout the several drawings described below.

DETAILED DESCRIPTION OF THE PREFERRED EMBODIMENTS

Figure 1:
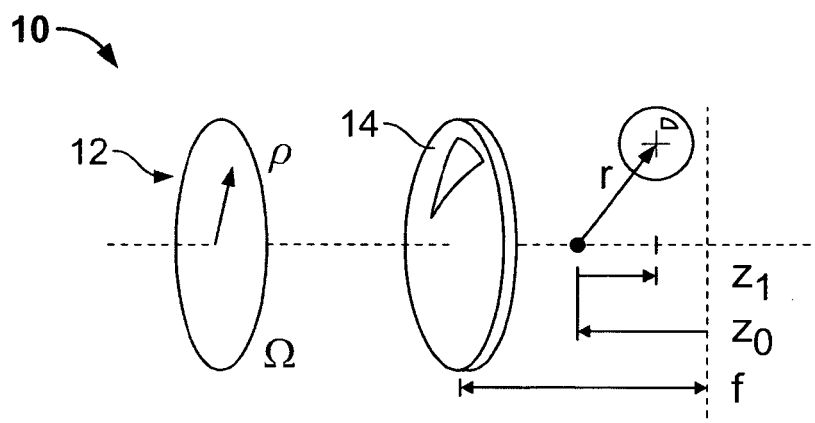
FIG. 1 is a schematic diagram of the geometry of an optimized holographic trapping system with light in the input pupil $\Omega$ focused by a strongly converging lens of focal length f to form an optical trap at r.

As shown in FIG. 1, a well known holographic optical trapping system 10 is powered by a collimated laser beam (not shown), which is relayed to the input pupil 12 of a high-numerical-aperture lens such as a microscope objective lens 14. This objective lens 14 focuses the laser beam to a diffraction-limited spot at a location determined by the beam's angle of incidence and degree of collimation at the lens' input pupil. Such a focused spot acts as a single-beam optical gradient force trap known as an optical trap or optical tweezer, which is capable of capturing and holding mesoscopic objects in three dimensions. Placing a wavefront-shaping hologram in a plane conjugate to the input pupil transforms the single optical tweezer into a pattern of holographic optical traps whose number, three-dimensional configuration, relative and absolute intensities, and mode structure all are encoded in the hologram. Deficiencies in the hologram's implementation might reasonably be expected to degrade all of these characteristics. This degradation can be quantified by expanding the projected field in a series of generalized conjugates to the designed field.

The complex field E(r), in a plane at distance z from the focal plane of the objective lens 14 of focal length f is related to the field in the lens' input plane by the Fresnel diffraction integral, $$E(r) = \frac{1}{\lambda f} \int_\Omega u_0(\rho) \exp(i\varphi_0(\rho)) \exp(i\Phi(\rho)) \exp\left(-i\frac{k\rho^2}{2f^2}z\right) \exp\left(-i\frac{kr\cdot\rho}{f}\right) d^2\rho, \quad (1)$$

where we have suppressed overall phase factors and assumed z<<f Here $u_0(\rho)$ and $\phi_0(\rho)$ are the real-valued amplitude and phase profiles, respectively, of the input laser beam 12 at position $\rho$ in the input pupil $\Omega$, as shown in FIG. 1, and k=2π/λ is the wavenumber of light of wavelength λ. A diffractive optical element (DOE) imposes the additional phase profile $\Phi(\rho)$, which ideally would correspond to the computer-generated hologram $\phi(\rho)$ encoding a desired pattern of traps. In practice, $\Phi(\rho)$ differs from the $\phi(\rho)$, so that $I(r)=|E(r)|^2$ differs from the planned trapping pattern in the plane of best focus.

Particularly when considering DOEs that encode three-dimensional trapping configurations, identifying the plane of best focus is the first step in assessing the impact of non-ideal phase encoding. If a simple beam-splitting DOE is illuminated with a collimated beam, we may take $\phi_0(\rho)=0$, and the resulting pattern of traps comes to sharpest focus when the remaining $\rho^2$-dependent phase term in the integrand of Eq. (1) vanishes, which occurs in the plane z=0. The optimized holographic trapping technique instead uses a slightly converging beam with $$\varphi_0(\rho) = -\frac{k\rho^2}{2f^2}z_0, \quad (2)$$

which shifts the plane of best focus to $z=z_0$, for $z_0 \ll f$. Artifacts due to imperfect phase modulation need not focus in the same plane, as we will see, and the resulting axial displacement can minimize their influence.

A representative optimized holographic optical trapping system is for example built around a 100×NA 1.4 PlanApo oil immersion objective lens mounted in a Nikon TE-2000U inverted optical microscope. Laser light at a wavelength of 532 nm provided by a Coherent Verdi laser, is imprinted with computer-generated holograms by a Hamamatsu X8267-16 spatial light modulator (SLM) which acts as a DOE with a 768×768 array of pixels. The focused optical traps 16 are imaged by placing a mirror (not shown) in the objective lens' focal plane and capturing the reflected light onto a conventional NEC TI-324AII charge-coupled device (CCD) camera (not shown).

Most DOEs, including SLMs, can impose only a limited range of phase delays, which ideally corresponds to one wavelength of light, so that $\phi(\rho) \bmod 2\pi = \phi(\rho)$. Introducing the DOE's phase transfer function, $f(x)$, such that $\Phi(\rho) = f(\phi(\rho))$, and noting that $\exp(i\phi)$ is a periodic function of $\phi$ with period $2\pi$, we may expand the DOE's contribution to the field's phase factor in a Fourier series $$\exp(i\Phi(\rho)) = \sum_{n=-\infty}^{\infty} a_n \exp(in\varphi(\rho)) \quad (3)$$

with coefficients $$a_n = \frac{1}{2\pi}\int_0^{2\pi} \exp(if(x))\exp(-inx)dx. \quad (4)$$

We accordingly define the generalized n-th order conjugate fields, $$E_n(r) = \quad (5)$$
$$\frac{1}{\lambda f}\int_\Omega u_0(\rho)\exp(i\varphi_0(\rho))\exp(in\varphi(\rho))\exp\left(-i\frac{k\rho^2}{2f^2}z\right)\exp\left(-i\frac{kr\cdot\rho}{f}\right)d^2\rho.$$

The projected field is then $$E(r) = \sum_{a=-\infty}^{\infty} a_n E_n(r). \quad (6)$$

For example, if a DOE created for one wavelength of light, $\lambda$, is illuminated with another, $\lambda'$, then $\Phi(\rho) = \gamma\phi(\rho)$ with $\gamma = \lambda/\lambda' \neq 1$ and $$a_n = \exp(i\pi(n-\gamma))\frac{\sin(\pi(n-\gamma))}{\pi(n-\gamma)}. \quad (7)$$

Comparable results may be obtained for more general phase transfer functions, including those featuring discrete phase levels. The most stringent test, binary phase holograms with $$f(x) = \begin{cases} 0 & x \leq a \\ b & a < x \leq 2\pi \end{cases}, \quad (8)$$

are described in this way with coefficients $$a_n = -\frac{2i}{n\pi}\exp\left(-i\frac{na}{2}\right)\exp\left(i\frac{b}{2}\right)\sin\left(\frac{na}{2}\right)\sin\left(\frac{b}{2}\right). \quad (9)$$

whose magnitude also falls off with order as $1/n$. Best performance, in this case, is obtained with $a=b=\pi$.

Equation (6) reveals that the projected image $$I(r) = \sum_{m,n=-\infty}^{\infty} a_n a_m^* E_n(r) E_m^*(r) \quad (10)$$

includes a proportion $|\alpha_1|^2$ of the intended intensity profile, $I_1(r) = |E_1(r)|^2$, even if the DOE imperfectly implements the requisite hologram. This first-order image is a faithful, undistorted realization of the designed pattern whose accuracy is limited only by errors in calculating $\phi(\rho)$ and physical imperfections in the optical train. The other terms in Eq. (10) represent artifacts due to the DOE's phase transfer function $f(x)$.

The term $|\alpha_0|^2 |E_0(r)|^2$ describes the undiffracted portion of the input beam, which typically comes to a focus in the center of the plane $z=-z_0$. Because it receives a fixed proportion of the light, the resulting "central spot" can be brighter than any of the intended traps in $I_1(r)$.

Figure 2:
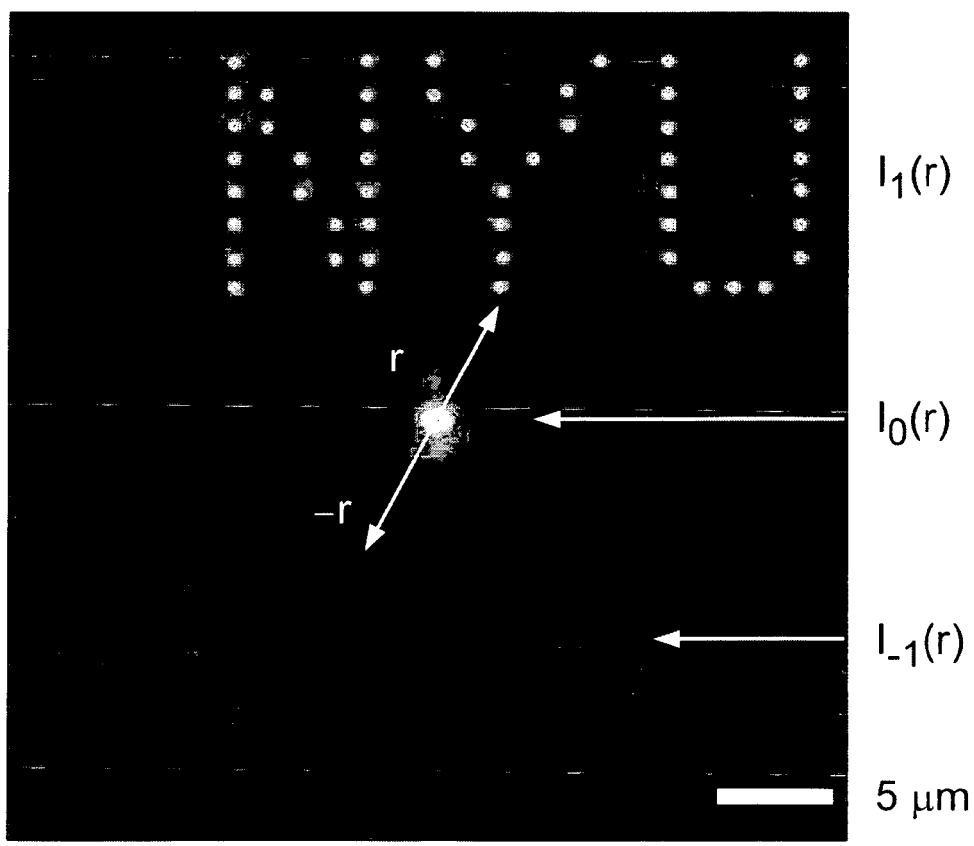
FIG. 2 shows experimentally realized general conjugate images, $I_o(r)$ and $I_{-1}(r)$, to a planar arrangement of optical traps, $I_1(r)$.

Generalized conjugate fields are related by $E_{-n}(r) = E^*_n(-r)$ in the plane $z=-z_0$ so that the associated images $I_n(r) = |E_n(r)|^2 = I_{-n}(-r)$, are related by point reflection through the origin, as shown in FIG. 2. Furthermore, $I_n(r) \approx I_1(nr)$ because multiplying $\phi(\rho)$ by n proportionately increases the hologram's spatial frequency. The remaining terms in Eq. (10) thus describe a hierarchy of "ghost" images at locations dictated by integer scale dilations, point inversions, and their superpositions. Ghosts generally act as unintended traps. If they overlap with intended traps, however, the resulting interference can cause large deviations in their relative intensities.

In conventional holographic optical traps whose DOE is illuminated with collimated light, the entire hierarchy of conjugate fields is focused into the same plane. This means that the central spot, the ghosts, and the undesirable superpositions maximally affect the trapping pattern.

The optimized holographic trapping system eliminates most of these defects. Here, the input beam's curvature is offset by a compensating Fresnel lens function $$\varphi_z(\rho, z_1) = \frac{k\rho^2 z_1}{2f^2}, \quad (11)$$

added to the trap-forming hologram and implemented by the DOE. This shifts the trapping pattern a distance $z_1$ back along the optical axis toward the focal plane, which is useful for forming images of trapped objects. Because $\phi_z(\rho, z)$ also is affected by the DOE's phase transfer function, it contributes to the hierarchy of conjugate fields in Eq. (5). Noting also that n $\phi_z(\rho, z_1) = \phi_z(\rho, nz_1)$ shows that the n-th order generalized conjugate field $E_n(r)$ comes to best focus in the plane $z \approx -z_0 + n z_1$. Both the central spot and the ghost images therefore are projected away from the intended trapping pattern, and spurious superpositions are strongly suppressed. Artifacts due to practical limitations of the DOE's phase transfer function therefore should have a minimal influence on the number, configuration, or relative intensity of traps in an optimized holographic trapping system. This is consistent with the observed performance of such systems. The principal ramification of a non-ideal $f(x)$ is a reduction in the overall intensity $|\alpha_1|^2$ of the projected trapping pattern.

Adding $\phi_z(\rho, z_1)$ increases the complexity of the projected hologram, which can challenge the capabilities of DOE technologies with limited spatial bandwidths. Systematic metrics for assessing hologram complexity relative to DOE capabilities have yet to be developed. Consequently, the practical limitations of the optimized holographic trapping technique cannot yet be predicted. Nevertheless, complex three-dimensional optimized trapping patterns consisting of hundreds of independent traps have been created with a DOE consisting of an array of 768×768 phase pixels.

The final characteristic of holographically projected traps that we will consider is their mode structure. Conventional optical tweezers typically are formed from collimated $TEM_{00}$ modes whose wavefronts are planar. More exotic traps such as optical vortices and Bessel beams derive their interesting and useful properties from the detailed structure of their wavefronts. The structure necessary to create such traps can be imposed on a $TEM_{00}$ beam by a mode-forming hologram comparable to the beam-splitting hologram used to create arrays of holographic optical traps. Indeed, the beam-splitting and mode-forming operations can be combined in a single computer-generated hologram to create arrays of multifunctional optical traps. Here again, the phase transfer function, $f(x)$, of the DOE can affect the fidelity with which a particular mode is projected, and thus can influence the associated trap's functionality.

As a practical example, we consider optical vortices, torque-exerting traps created by focusing helical light beams. Helical modes are characterized by an overall phase factor $\exp(il\theta)$, where $\theta$ is the azimuthal angle about the optical axis. The integer winding number l sets the pitch of the helix, and is often referred to as the topological charge. The helical topology suppresses the intensity along the axis of such a beam, not because the amplitude vanishes but rather because of destructive interference due to the coincidence of all phases there. An optical vortex, therefore, focuses to a dark spot surrounded by a bright ring of light. In optical vortices created by imposing a helical phase profile on a Gaussian beam, the ring's radius scales linearly with topological charge.

Now we consider what happens to an optical vortex designed to have winding number l when projected by a non-ideal DOE. Because the Fourier coefficients in Eq. (6) fall off with index, we approximate the field in the focal plane by the principal terms $$E(r) \approx \alpha_1 E_1(r) + \alpha_0 E_0(r) + \alpha_{-1} E_{-1}(r). \quad (12)$$

Taking $E_1(r) = u_l(r) \exp(il\theta)$ for an optical vortex centered within a standard holographic optical trapping system, the conjugate field is $$E_{-1}(r) = E_1^*(-r) = (-1)^l u_l(r) \exp(-il\theta). \quad (13)$$

The resulting intensity distribution, $$I(r) = A_0(r) + A_1 \cos(l\theta + \theta_1) + A_2(r) \cos(2l\theta + \theta_2), \quad (14)$$

is characterized by azimuthal intensity modulations with both l-fold and 2l-fold symmetry. Taking $\alpha_n = |\alpha_n| \exp(i\beta_n)$, and defining $\alpha^2 = |\alpha_1|^2 + |\alpha_{-1}|^2$ and $= b^2 = 2|\alpha_1| |\alpha_{-1}|$ these terms' relative amplitudes are $A_0(r) = |\alpha_0|^2 u2/0(r) + \alpha^2 u2/l(r)$, $A_1(r) = 2|\alpha_0|[\alpha^2 + (-1)^l b^2 \cos(2\beta_0 - \beta_1 - \beta_{-1})]^{1/2} u_0(r) u_l(r)$, and $A_2(r) = b^2 u2/l(r)$. Their relative phases are given by $$\tan\theta_1 = \frac{|a_1|\sin(\beta_1 - \beta_0) + (-1)^l |a_{-1}|\sin(\beta_0 - \beta_{-1})}{|a_1|\sin(\beta_1 - \beta_0) + (-1)^l |a_{-1}|\sin(\beta_0 - \beta_{-1})}. \quad (15)$$

and $\theta_2 = l\pi + \beta_1 - \beta_{-1}$.

In principle, the central spot's amplitude profile, $u_0(r)$, is sharply peaked around the optical axis and so should not overlap substantially with the optical vortex's ring-like profile, $u_l(r)$. The l-fold intensity corrugation resulting from their interference therefore should be negligible for l>>1. Even so, holographically projected optical vortices such as the example in FIG. 3(a) often are surrounded by l (=30) radial spokes. These outer spokes arising from the DOE finite spatial resolution are projected from the hologram's central region, whose features typically are too fine to be reproduced faithfully by a pixellated DOE. The undersampled phase pattern near the optical axis acts as a diffuser and scatters light to larger radii where it contributes to the visible spokes. Both these and the optical vortex's higher-order diffraction rings can be eliminated by excising the central region of the mode-forming phase mask.

Figure 3:
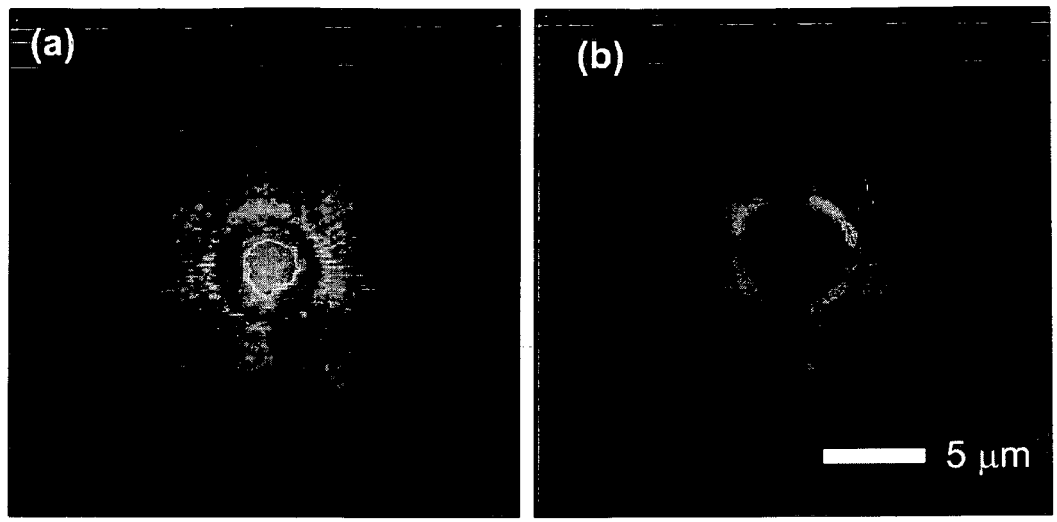
FIG. 3(a) shows the effect of interference between an on-axis optical vortex and $I_o(r)$, and FIG. 3(b) demonstrates the elimination of this interference in an optical vortex that is displaced away from the optical axis.

Whereas the l-fold features are largely due to the DOE's pixellated structure, the 2l-fold corrugation results from interference between the principal and conjugate fields. This corrugation, which also can be seen in FIG. 3(a), significantly affects the dynamics of objects trapped on the circumference of an optical vortex. It can be minimized by displacing the principal vortex away from the center of the field of view. Ideally, this eliminates modulation of the optical vortex's circumferential intensity profile altogether, as shown in FIG. 3(b). Because optical vortices are far more extensive than conventional optical tweezers, however, some interference with neighboring and ghost traps can occur in more complex configurations. Optimizing the phase transfer function to minimize these interactions thus is more important in creating multifunctional optical traps than in projecting arrays of conventional optical tweezers.

Figure 4:
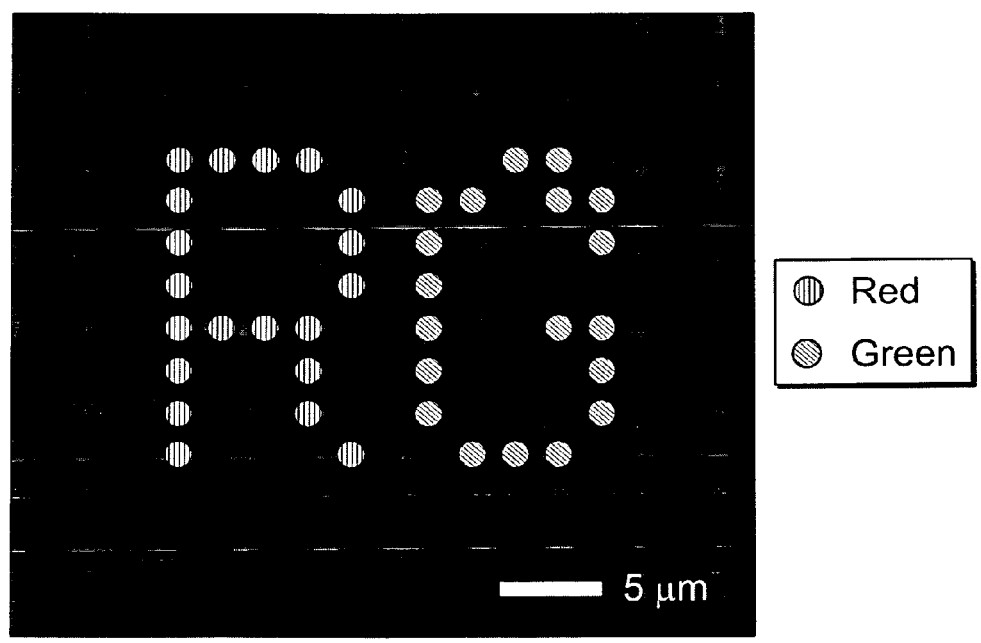
FIG. 4 shows simultaneous projection of 685 nm red light and 532 nm green light holographic optical trapping patterns with a single computer generated diffractive optical element.

Expanding the projected field in a series of generalized conjugate fields clearly demonstrates that imperfections in a DOE's phase transfer function only minimally influence the number, distribution, relative intensities and mode structure of optimized holographic traps encoded in a computer-generated hologram. This robustness suggests a strategy for projecting holographic traps in multiple wavelengths simultaneously. Because of the wavelength dependence of $\phi_0(\rho)$ in Eq. (2), beams of different wavelengths would focus to different planes in an optimized holographic optical trapping system, even with achromatic optics. Separate holograms can be calculated for each wavelength, each with the appropriate displacement along the optical axis, and the results added to create a multi-wavelength hologram that projects distinct patterns of traps in each of a plurality of colors. As in previous approaches to multi-wavelength holography, all patterns are projected in each wavelength. This is less of a problem for holographic trapping than for data multiplexing or image formation because the unintended patterns in each color are displaced out of the plane of best focus, and typically out of the sample altogether. The result is that only the designed patterns in each color will be projected into the focal volume, as shown in FIG. 4 where the "R" is composed of red spots and "G" is composed of green spots. Suppressing the unintended patterns in each wavelength of a multicolor holographic trapping pattern is possible in color separation gratings.

Multicolor holographic optical trapping should facilitate simultaneous manipulation and photochemical transformation of light-sensitive systems. This would be useful for non-invasive intracellular surgery and for assembling and photochemically bonding three-dimensional heterostructures. Multicolor arrays also will be useful for sorting objects by their responses to light of different wavelengths, for example in holographically implemented optical fractionation. Combining these functions on a single DOE would simplify the implementation by projecting all wavelengths along a single path. Success in this area most likely will require tight control over and precise calibration of the DOE's phase transfer function.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A system for providing holographic optical traps with the traps having different selected ones of a plurality of different wavelengths of light, comprising:
   a source of laser light;
   a diffractive optical element for providing a computer generated hologram for operating on the laser light to produce a plurality of separate patterns of optical traps; and
   the diffractive optical element interacting with the laser light to simultaneously produce separate sets of a plurality of optical traps, each one of the optical traps being of a different one of a plurality of colors of a selected different light wavelength with each of the selected different light wavelengths having an associated different focal plane location along the optical axis and the different colors being displayed simultaneously wherein any central spot from the laser light and any ghost images are not superimposed with any of the optical traps.

2. The system as defined in claim 1 wherein the diffractive optical element provides preprogrammed separate holograms for each of said different light wavelengths.

3. The system as defined in claim 1 wherein the diffractive optical element provides a hologram which selectively suppresses an unwanted light wavelength for patterns of optical traps.

4. The system as defined in claim 1 wherein the diffractive optical element is encoded to operate on the laser light in accordance with the expression, $$\Phi_o(\rho) = k\rho^2 z_o / 2f^2$$

Where $\Phi_o(\rho)$ is the additional imposed phase profile, $k = 2\pi/\lambda$, $z_o$ is the origin plane "z" coordinate, $\rho$ is the position in the input pupil $\Omega$ and f is focal length.

5. The system as defined in claim 1 wherein said optical component includes achromatic optics.

6. The system as defined in claim 1 wherein said optical component and said diffractive optical element projects the pattern of optical traps at selected focal volume locations for separate utilization purposes.

7. The system as defined in claim 1 further including a downstream light-sensitive system for processing by the pattern of optical traps of the different light wavelengths.

8. The system as defined in claim 7 wherein the light-sensitive system comprises at least one of a biological component and a heterostructure for structural assembly by the optical traps of different light wavelength.

9. The system as defined in claim 7 further including a plurality of objects which are sorted by virtue of light wavelength sensitivity of at least a portion of each of the plurality of objects.

10. The system as defined in claim 9 wherein the plurality of objects are sortable by optical fractionation.

11. The system as defined in claim 9 wherein the diffractive optical element includes a controlled phase transfer function.

12. The system as defined in claim 1 wherein the source of laser light provides at least one wavelength of laser light which can be processed by the diffractive optical element.

13. A method of generating a plurality of different color holographic optical trap patterns separated in space, comprising the steps of:
   generating an incident laser beam;
   interacting the incident laser beam with a diffractive optical element and providing a computer generated hologram having a wavelength sensitive hologram, the diffractive optical element producing a plurality of patterns of optical traps; and
   using the diffractive optical element to focus the plurality of patterns of optical traps with each pattern having traps formed from a distinct one of a plurality of different light color wavelengths at a different focal plane than another color wavelength, each different color pattern utilized separately for a selected functionality and being displayed simultaneously with other color patterns wherein any central spot from the laser light and any ghost images are not superimposed with any of the optical traps.

14. The method as defined in claim 13 further including the step of programming the hologram to selectively pass and attenuate particular colors to form the plurality of patterns of optical traps.

15. The method as defined in claim 13 further including the step of applying the plurality of patterns of optical traps with different color to a light-sensitive system.

16. The method as defined in claim 13 wherein the light-sensitive system comprises a heterostructure for structural assembly by the plurality of patterns of optical traps.

17. The method as defined in claim 13 wherein the plurality of patterns of optical traps are projected to a plurality of different spatial locations.

18. The method as defined in claim 13 further including at least one of the step of applying the patterns of optical traps to objects for sorting the objects responsive to color sensitivity by the objects and the step of applying the patterns of optical traps to perform wavelength sensitive biological processing/manipulation.

19. The method as defined in claim 13 wherein the step of interacting the laser beam with the diffractive optical element includes creating a plurality of diffracted light beams, at least one of the diffracted beams having specified wavefront properties different from the incident laser beam, thereby enabling creation of a variety of different optical traps for use.

* * * * *